United States Patent Office 3,301,603
Patented Jan. 31, 1967

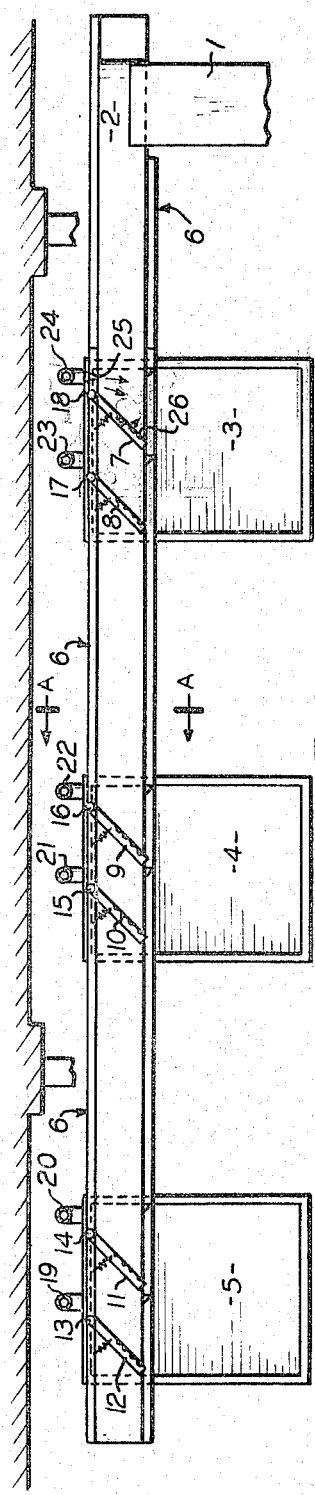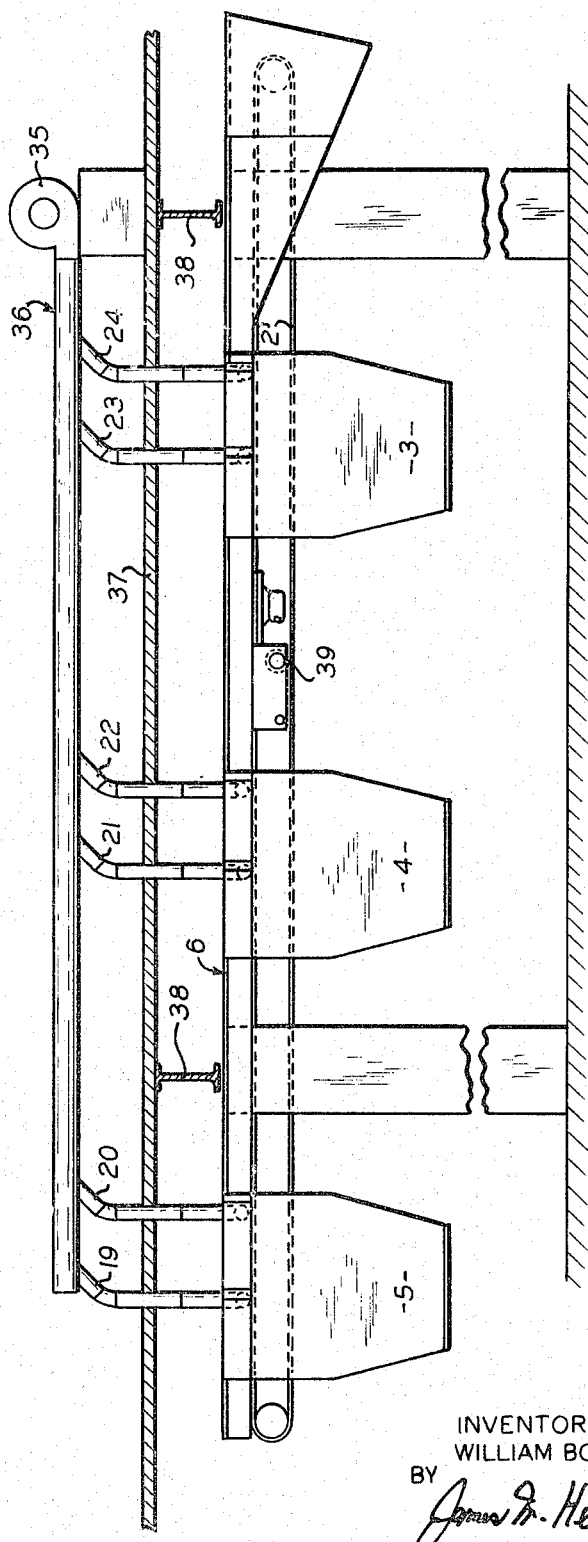

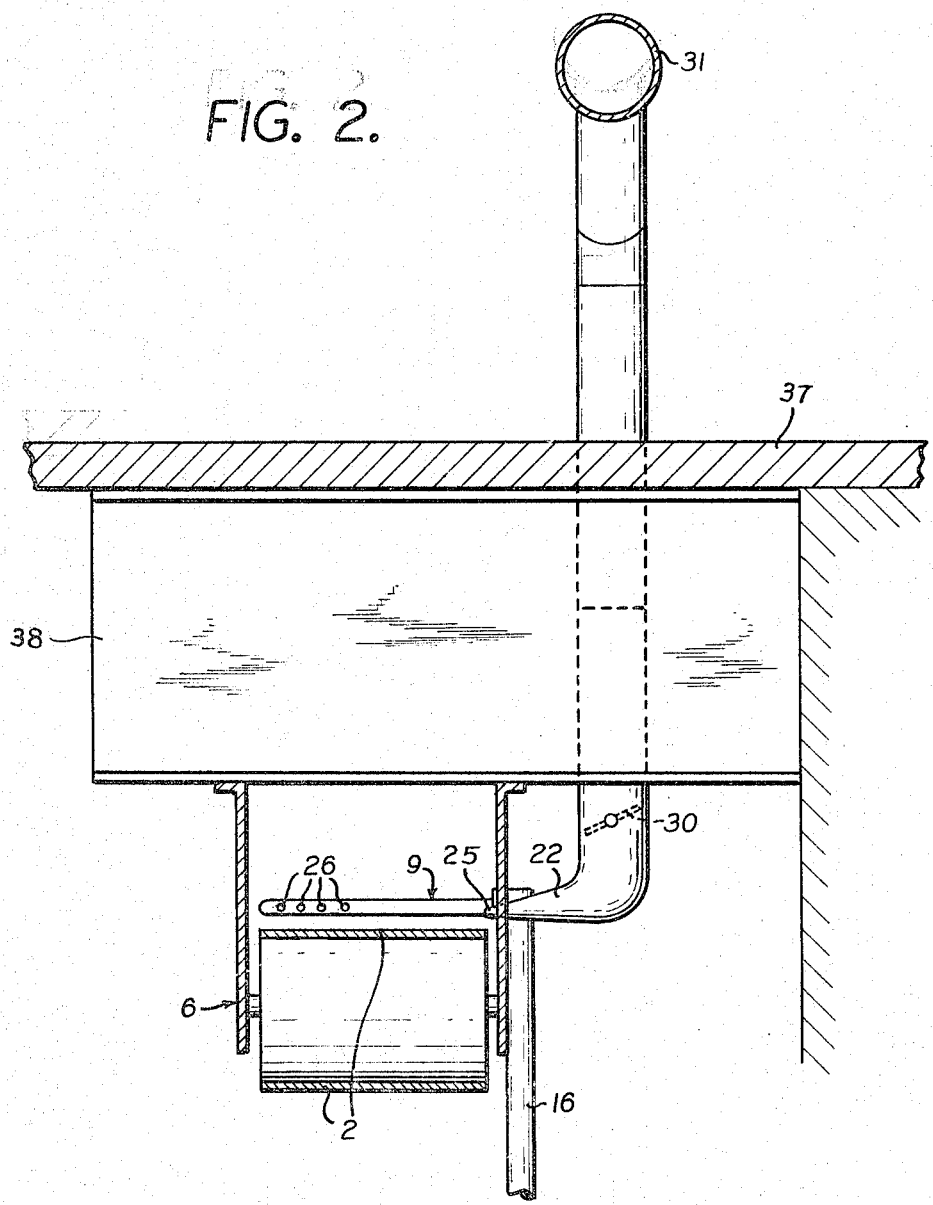

3,301,603
AIR SWEEP CONVEYOR
William Boon, The Tower, 215 Passaic Ave.,
Passaic, N.J. 07055
Filed Apr. 23, 1964, Ser. No. 362,081
1 Claim. (Cl. 302—19)

The present invention is broadly concerned with an improved conveyor system, i.e., an air sweep conveyor, called an "Air-veyor." The invention is more particularly concerned with a conveyor system wherein the materials being conveyed can be effectively and efficiently discharged or removed from the moving conveyor at designated discharge points very quickly. In accordance with a specific adaption of the present invention, baffles are used in combination with directed air jets to effectively discharge material from the moving conveyor at selected discharge stations. The present system is particularly adapted for conveying towels, handkerchiefs, underwear, etc. in a textile factory, or in a laundry for linen and the like from one area to a distant receiving station or stations. The system is also particularly adapted for rapid and effective separation or classification of laundry to a plurality of selected receiving stations such as hoppers, trucks, driers, washing units, and the like.

It is known in the art to use many methods and different types of apparatuses to carry and to classify materials, such as laundry. It is also known to use various techniques to remove the materials being conveyed at selected discharge stations. However, the methods known in the art have certain disadvantages, particularly when removing certain materials, such as laundry, especially from a rapidly moving conveyor, such as a belt conveyor. If the fabrics are of varying weights and sizes, many of the systems known require continual or periodic adjustments. Also, many of the known systems tend to damage delicate and fine fabrics when they remove these fine fabrics from a rapidly moving conveyor system.

The present apparatus and technique overcomes these disadvantages and effectively and rapidly conveys and classifies materials, and is particularly adapted for conveying laundry and linens.

While the present system works with rapidity and accuracy on all sizes, shapes and weights of fabrics, it requires no mechanical adjustments and will not harm fine linens and delicate fabrics being processed.

The apparatus and technique of the present invention may be readily understood by reference to the drawings, illustrating certain embodiments of the same. FIGURE 1 is a diagrammatical top view of the conveying assembly, while FIGURE 2 is a view taken through A—A of FIGURE 1. FIGURE 3 is a side view of the conveying assembly.

Referring particularly to FIGURE 1, materials such as laundry are raised from a supporting floor by means of inclined conveyor 1. This conveyor is preferably an air conveyor which passes the fabrics to a storage collector, then onto elevated conveyor 2. Conveyor 1 may be of a conventional design and the materials may drop off the upper end of conveyor 1 onto the top surface of the moving elevated conveyor 2. The width of conveyor 2 may be varied widely, but preferably has a width in the range from about 10 inches to 20 inches, such as about 12 inches.

The conveyor 2 may be a neoprene impregnated conveyor belt or made of other suitable material, such as cotton, rubber, leather, or metal-top transmission belting and the like. The belt is supported by conventional means 6 and is also driven by conventional means (not shown).

Hoppers or storage bins 3, 4 and 5 are receiving stations positioned along and below the conveying belt 2. These bins may extend under the conveyor as shown, and may be, for example, about 4 feet square for a 12-inch wide belt. These bins or receiving stations may be about 8 to 20 feet apart, such as, about 10 feet apart along the belt.

In accordance with the present invention, a series of air sweeps 7, 8, 9, 10, 11 and 12 are used in combination with the conveying belt. These air sweeps are positioned along the belt on the opposite side of the belt at the receiving bins or other receiving devices, such as, tables, other belt conveyors, trucks or other devices.

These air sweeps may comprise a flat plate, but preferably are of a hollow construction through which air is forced, thereby sweeping the material that is being conveyed off the side of the conveyor into the designated bin or other station.

The baffles or arc sweep gates are mounted on shafts at the side of the conveyor and may be activated by various means. These sweep baffles may be activated hand or by mechanical means, but preferably are activated by electrical means, to secure the desired rotation of the sweep.

Shafts 13, 14, 15, 16, 17 and 18 are shown on the left hand side of the conveyor, but they may be positioned on either side of the conveyor. The baffles preferably nest or seat into recesses in the conveyor frame when they are not utilized for diverting material from the belt of the conveyor.

Air conduits 19, 20, 21, 22, 23 and 24 are preferably connected to a common air supply manifold. These elements have nozzles at the ends thereof so as to direct air jets of sufficient velocity across the moving belt, thereby causing the material to be removed from the belt at the desired receiving station. As illustrated with respect to conduit 24, the air is jetted through nozzles 25.

Also as illustrated in detail with respect to air conduit 24, air is passed through sweep 7 and jetted through jets 26 substantially countercurrent to the direction of flow of the material on the belt. This cross-jetting of air through nozzles 25 and 26 effectively functions to rapidly remove the laundry or linen from the moving belt.

As mentioned heretofore, there are one or more air lines consisting of high pressure air or high volume low pressure air, depending on the type and character of the material being conveyed. For example, high density small materials are preferably removed by a high pressure air stream. On the other hand, long materials or garments, such as, clothes, yard goods, and the like, are preferably removed by a high volume low pressure air stream of sufficient velocity to sweep the material off the conveyor at the designated points of receiving stations.

As illustrated in FIGURE 1, one or more baffles or sweeps may be positioned along the conveyor, depending on the design classification of the conveying system and the character of the material to be moved and classified. The air sweep or air supplied by the piping is controlled and actuated in conjunction with the respective sweep baffles, which may sweep the material onto an adjacent conveyor for further classification or into receiving hoppers, trucks, or any other receiving device.

Referring to FIGURE 2, which is a view taken through A—A of FIGURE 1, conveyor 2 is shown supported by a conventional conveyor support 6 which is attached to the ceiling beam. The conveyor also could be floor mounted. Air conduit 22 containing a damper 30 is connected to a common air manifold 31. Nozzle or jets 25 direct air flow across belt 2 so as to discharge the material from the belt. Shaft or support 16 actuates sweep 9 to move the same across the belt. Sweep 9 contains holes or jets 26 through which air is caused to flow, thereby aiding the removal of the material from the belt into the bins or other receptacles. Air of sufficient volume and pressure may be supplied to sweep 9 from air supply conduit 22 by various means such as by means of a flexible conduit.

These holes, or jets 26 in sweep 9 serve to prevent the moving material such as laundry, from jamming up against the sweep, and also in combination with the jetted air through nozzles 25 by providing the desired vector force effectively control the removal of the laundry from the belt.

While it is preferred that the sweeps be rotatable across the belt by means of rotatable shafts 16, it is within the concept of the present invention to mount elements across the belt at a distance sufficiently above the belt to permit laundry and the like to flow thereunder when air is not being jetted from these elements. This will make for a simpler type of construction, but under certain conditions will not function as effectively as the movable sweeps.

Reference is made to FIGURE 3 which is a side view of the conveying assembly. Elements which are similar to the elements of FIGURE 1 are similarly numbered. Air is forced through a main conduit 36 by means of blower 35, and then through air conduits 19, 20, 21, 22, 23 and 24, which ducts supply the required volume of air at the required velocity to the jets which cross sweep the conveyor to discharge the material from the conveyor 2. The conveyor is supported by conventional structure 6 which is attached to ceiling or roof 37 by means of struts 38. The conveyor belt is driven by a conventional motor or drive mechanism 39.

The operation of the apparatus is as follows: As the articles are moved along by conveyor belt 2 (see FIG. 2), valve 30 in conduit 24 is opened by conventional hand, mechanical or electrical means. Conduit 24 is connected to manifold 31 and supplies air for both jets 25 and jets 26. If the forward portion of bin 3 is filled, or if that particular type article should be deposited in the rear portion of bin 4, valve 30 will be rotated to a closed position so that no air can escape through jets 25 and 26. At the same time, sweeps 7, 8, and 9 will be retracted into recesses in the conveyor frame by tension springs (see FIG. 1), and the article will be moved along until it is struck by the combined jets from 21 and 10 and forced into the rear portion of bin 4. Here again the valve in conduit 21 and the movement of the sweeps or arms pivoted in shafts 16 are operated by conventional hand, mechanical, or electrical means.

Obviously when the modified form is used, i.e., when the sweeps are permanently positioned a sufficient height above the belt so that articles may pass beneath, the sweeps will not be pivoted but will remain across the belt and only the directed combined blasts of air, at a predetermined time, will remove the article from the belt and into the selected position of the selected bin.

The present invention comprises a positive technique and apparatus for rapidly and effectively conveying and classifying linen and laundry. Due to the fact that the material is contacted with pneumatic air jets or streams, rather than by mechanical means, fraying, tearing and distortion of materials is eliminated. Thus, the system is adapted for classification of wide varieties of fabrics, from the very large, coarse, and heavy to the very small, fine and dainty fabrics. The equipment is of such a nature that it will require very little upkeep and maintenance, and will incur substantially no operating difficulties.

What is claimed is:

An air sweep conveying and classification system for fabrics which comprises in combination, a belt conveyor, means for driving said belt conveyor, means for placing fabrics on said belt conveyor, receiving stations positioned along said belt conveyor, sweeps having perforations positioned diagonally across said conveyor adjacent said receiving stations, means for forcing air through said perforations across said belt in the direction of said receiving stations whereby said fabric materials will be moved from said belt and into said receiving stations solely by said air forced through said perforations, said perforated sweeps extending across said belt adjacent said receiving stations, and rotatable means are provided alongside said belt to move said perforated sweep alternatively over and completely clear of said belt as desired, said sweep being a hollow tube and forming an air duct, and said perforations in the form of jets communicating with said air duct so that air forced through said jets have a direction substantially perpendicular to the direction of flow of said fabrics, and wherein said perforated sweeps are positioned a sufficient distance above said belt conveyor to permit fabrics to pass thereunder on said belt when air is not being forced through said jets and upon said fabrics.

References Cited by the Examiner

UNITED STATES PATENTS

| 1,845,562 | 2/1932 | Sandberg | 198—188 |
| 2,861,840 | 11/1958 | Powischill et al. | 302—19 |
| 3,138,408 | 6/1964 | Bruce et al. | 302—11 |

ANDRES H. NIELSEN, *Primary Examiner.*